US010906472B2

(12) United States Patent
Stone (10) Patent No.: US 10,906,472 B2
(45) Date of Patent: Feb. 2, 2021

(54) APPARATUS AND METHOD FOR A MULTI-HITCH RECEIVER ASSEMBLY (71) Applicant: Sherman Paul Stone, Signal Mountain, TN (US)

(72) Inventor: Sherman Paul Stone, Signal Mountain, TN (US)

(*) Notice: Subject to any disclaimer, the term of this patent is extended or adjusted under 35 U.S.C. 154(b) by 0 days.

(21) Appl. No.: 16/178,790

(22) Filed: Nov. 2, 2018

(65) Prior Publication Data

US 2019/0126841 A1 May 2, 2019

Related U.S. Application Data (60) Provisional application No. 62/580,733, filed on Nov. 2, 2017.

(51) Int. Cl.
*B60R 9/10* (2006.01)
*B62D 63/08* (2006.01)
*B60R 11/00* (2006.01)
*B62D 63/06* (2006.01)

(52) U.S. Cl.
CPC ............... *B60R 9/10* (2013.01); *B60R 11/00* (2013.01); *B62D 63/062* (2013.01); *B62D 63/08* (2013.01); *B60R 2011/004* (2013.01); *B60R 2011/0066* (2013.01); *B60R 2011/0084* (2013.01)

(58) Field of Classification Search
CPC ... B60D 1/52; B60D 1/54; B60D 1/48; B60D 1/481; B60R 9/10; B60R 11/00; B60R 2011/004; B60R 2011/0066; B60R 2011/0084; B62D 3/08; B62D 21/20; B62D 3/06; B62D 63/064; B62D 63/067; B62D 63/08

USPC .................................................. 224/518–521
See application file for complete search history.

(56) References Cited

U.S. PATENT DOCUMENTS

| | | | | | |
|---|---|---|---|---|---|
| 4,361,947 A | * | 12/1982 | Arnaud | .................... | B23P 13/04 114/102.15 |
| 5,040,825 A | * | 8/1991 | Kuhns | ..................... | B60P 3/066 280/789 |
| 5,158,315 A | * | 10/1992 | Godbersen | ............ | B60P 3/1066 280/414.1 |
| 5,476,279 A | * | 12/1995 | Klemetsen | ............... | B60D 1/07 280/415.1 |
| 5,562,298 A | * | 10/1996 | Kass | ........................ | B60D 1/06 280/406.1 |
| 6,125,945 A | * | 10/2000 | Skaggs | ................ | A01B 59/043 172/439 |

(Continued)

Primary Examiner — Adam J Waggenspack
(74) Attorney, Agent, or Firm — Chambliss, Bahner & Stophel, P.C.

(57) ABSTRACT

A multi-hitch receiver assembly adapted for use on a trailer comprising a main frame that is adapted to be secured to the trailer, a means for securing the main frame to the trailer, and at least one receiver box assembly. The at least one receiver box assembly comprises a first member that is adapted to be secured to the main frame, a second member that is adapted to removably secure a first cargo carrier and is secured to the first member, and a third member that is adapted to removably secure a second cargo carrier and is secured to the second member. The at least one receiver box assembly is adapted to be secured to the main frame at more than one location on the main frame. A method comprising securing the main frame to the trailer.

15 Claims, 11 Drawing Sheets (56) References Cited

U.S. PATENT DOCUMENTS

| | | | |
|---|---|---|---|
| 6,213,491 B1 * | 4/2001 | Southard, Jr. | B60D 1/66 |
| | | | 254/420 |
| 7,255,362 B2 * | 8/2007 | Smith | B60D 1/46 |
| | | | 280/462 |
| 7,784,813 B2 * | 8/2010 | Columbia | B60D 1/06 |
| | | | 280/495 |
| 8,469,429 B1 * | 6/2013 | Spronk | B60R 11/00 |
| | | | 296/37.1 |
| D697,838 S * | 1/2014 | Borkholder | D12/162 |
| 8,840,000 B1 * | 9/2014 | Simpson | B62D 43/02 |
| | | | 224/42.21 |
| 8,893,939 B2 * | 11/2014 | Brass | B60D 1/60 |
| | | | 224/515 |
| 9,199,582 B2 * | 12/2015 | Hill | B60R 9/00 |
| 9,387,739 B2 * | 7/2016 | Babuska | B60D 1/54 |
| 9,868,327 B1 * | 1/2018 | Borkholder | B60D 1/485 |
| 10,183,538 B2 * | 1/2019 | Palmer | F16M 13/02 |
| 2006/0289580 A1 * | 12/2006 | Faver | B60D 1/06 |
| | | | 224/521 |
| 2011/0024473 A1 * | 2/2011 | Weiss | B60R 9/06 |
| | | | 224/500 |
| 2015/0028562 A1 * | 1/2015 | Hill | B62D 63/08 |
| | | | 280/400 |

\* cited by examiner

APPARATUS AND METHOD FOR A MULTI-HITCH RECEIVER ASSEMBLY

CROSS-REFERENCES TO RELATED APPLICATIONS/PATENTS

This application relates back to and claims the benefit of priority from U.S. Provisional Application for Patent Ser. No. 62/580,733 titled "Bike Rack System" and filed on Nov. 2, 2017.

FIELD OF THE INVENTION

The present invention relates generally to apparatuses and methods for cargo carriers, and particularly to apparatuses and methods for scalable cargo carrier assemblies.

BACKGROUND AND DESCRIPTION OF THE PRIOR ART

It is known to use apparatuses and methods to removably secure bicycles and other cargo during vehicular transport. Conventional apparatuses and methods, however, suffer from one or more disadvantages. For example, conventional apparatuses and methods are undesirably expensive, complicated, large, and difficult to use. Conventional apparatuses and methods also have limited capacity, are not scalable, and are not adapted for use with different-sized bicycles, bicycle racks, and other cargo carriers. Further, conventional apparatuses and methods restrict access to the rear compartment of a vehicle, require some amount of bicycle disassembly, and do not efficiently serve as a means for storing cargo such as bicycles when they are not in transit. Still further, conventional apparatuses and methods do not sufficiently reduce either the tongue weight on the rear axle of the transporting vehicle or the rattling of the apparatus and/or cargo such as bicycles. In addition, conventional apparatuses and methods do not safely secure cargo such as bicycles during transport.

It would be desirable, therefore, if an apparatus and method for a multi-hitch receiver assembly could be provided that is inexpensive, simple, compact, and easy to use. It would also be desirable if such an apparatus and method for a multi-hitch receiver assembly could be provided that has unlimited capacity, is scalable, and is adapted for use with different-sized bicycles, bicycle racks and other cargo carriers. It would be further desirable if such an apparatus and method for a multi-hitch receiver assembly could be provided that does not restrict access to the rear compartment of a vehicle, does not require any bicycle disassembly, and serves as an efficient means for storing cargo such as bicycles when they are not in transit. It would be still further desirable if such an apparatus and method for a multi-hitch receiver assembly could be provided that reduces both the tongue weight on the rear axle of the transporting vehicle and the rattling of the apparatus and/or cargo such as bicycles. In addition, it would be desirable if such an apparatus and method for a multi-hitch receiver assembly could be provided that safely secures cargo such as bicycles during transport.

Advantages of the Preferred Embodiments of the Invention

Accordingly, it is an advantage of the preferred embodiments of the invention claimed herein to provide an apparatus and method for a multi-hitch receiver assembly that is inexpensive, simple, compact, and easy to use. It is also an advantage of the preferred embodiments of the invention claimed herein to provide an apparatus and method for a multi-hitch receiver assembly that has unlimited capacity, is scalable, and is adapted for use with different-sized bicycles, bicycle racks, and other cargo carriers. It is another advantage of the preferred embodiments of the invention claimed herein to provide an apparatus and method for a multi-hitch receiver assembly that does not restrict access to the rear compartment of a vehicle, does not require any bicycle disassembly, and serves as an efficient means for storing cargo such as bicycles when they are not in transit. It is still another advantage of the preferred embodiments of the invention claimed herein to provide an apparatus and method for a multi-hitch receiver assembly that reduces both the tongue weight on the rear axle of the transporting vehicle and the rattling of the apparatus and/or cargo such as bicycles. It is yet another advantage of the preferred embodiments of the invention claimed herein to provide an apparatus and method for a multi-hitch receiver assembly that safely secures cargo such as bicycles during transport.

Additional advantages of the preferred embodiments of the invention will become apparent from an examination of the drawings and the ensuing description.

EXPLANATION OF THE TECHNICAL TERMS

As used herein, the term "cargo carrier" mean any device, mechanism, assembly or combination thereof that is adapted to removably secure an item of cargo during vehicular transport. The term "cargo carrier" includes, without limitation, bicycle racks, kayak racks, paddleboard racks, truck bed extenders, and the like.

As used herein, the terms "first means for removably securing a first cargo carrier" and "second means for removably securing a second cargo carrier" mean any device, mechanism, assembly or combination thereof that is adapted to removably secure a cargo carrier during vehicular transport. The terms "first means for removably securing a first cargo carrier" and "second means for removably securing a second cargo carrier" include, without limitation, pins (as defined below), tensioners (as defined below), any combination thereof, and the like.

As used herein, the term "means for securing the main frame to the trailer" means any device, mechanism, assembly or combination thereof that is adapted to secure the main frame to the trailer. The term "means for securing the main frame to the trailer" includes, without limitation, means for fixedly securing the main frame to the trailer and means for removably securing the main frame to the trailer. Means for fixedly securing the main frame to the trailer include welments, rivets, and the like. Means for removably securing the main frame to the trailer include pins (as defined below), tensioners (as defined below), plates, brackets, trailer crossmembers, any combination thereof, and the like.

As used herein, the term "pin" means any device, mechanism, assembly or combination thereof that is adapted to removably secure one object to another. The term "pin" includes, without limitation, clevis pins, cotter pins, hitch pins, any combination thereof, and the like.

As used herein, the term "tensioner" means any device, mechanism, assembly or combination thereof that is adapted to removably secure one object to another. The term "tensioner" includes, without limitation, threaded fasteners such as bolts, screws, nuts, and the like, washers, any combination thereof, and the like.

SUMMARY OF THE INVENTION

The apparatus of the invention comprises a multi-hitch receiver assembly adapted for use on a trailer. The preferred multi-hitch receiver assembly comprises a main frame that is adapted to be secured to the trailer, a means for securing the main frame to the trailer, and at least one receiver box assembly. The preferred at least one receiver box assembly comprises a first member that is adapted to be secured to the main frame, a second member that is adapted to removably secure a first cargo carrier and is secured to the first member, and a third member that is adapted to removably secure a second cargo carrier and is secured to the second member. Preferably, the at least one receiver box assembly is adapted to be secured to the main frame at more than one location on the main frame.

The method of the invention comprises providing a multi-hitch receiver assembly adapted for use on a trailer. The preferred multi-hitch receiver assembly comprises a main frame that is adapted to be secured to the trailer, a means for securing the main frame to the trailer, and at least one receiver box assembly. The preferred at least one receiver box assembly comprises a first member that is adapted to be secured to the main frame, a second member that is adapted to removably secure a first cargo carrier and is secured to the first member, and a third member that is adapted to removably secure a second cargo carrier and is secured to the second member. Preferably, the at least one receiver box assembly is adapted to be secured to the main frame at more than one location on the main frame. The method further comprises securing the main frame to the trailer.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Referring now to the drawings, the preferred embodiments of the multi-hitch receiving assembly in accordance with the present invention are illustrated by FIGS. 1 through 20. As shown in FIGS. 1-20, the preferred embodiments of the multi-hitch receiver assembly are inexpensive, simple, compact, and easy to use. The preferred embodiments of the multi-hitch receiver assembly also have unlimited capacity, are scalable, and are adapted for use with different-sized bicycles, bicycle racks, and other cargo carriers. The preferred embodiments of the multi-hitch receiver assembly do not restrict access to the rear compartment of a vehicle, do not require any bicycle disassembly, and serve as an efficient means for storing cargo such as bicycles when they are not in transit. The preferred embodiments of the multi-hitch receiver assembly reduce both the tongue weight on the rear axle of the transporting vehicle and the rattling of the apparatus and/or cargo such as bicycles. The preferred embodiments of the multi-hitch receiver assembly also safely secure cargo such as bicycles during transport.

Figure 1:
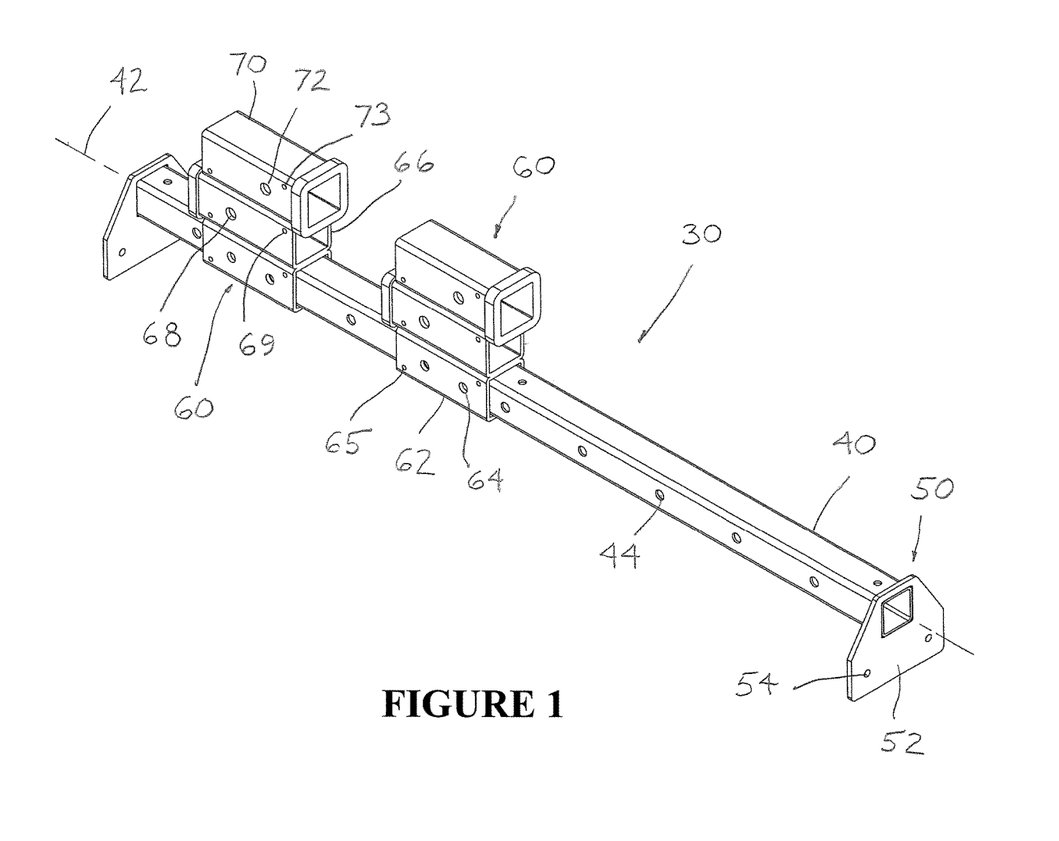
FIG. 1 is a back perspective view of the preferred embodiment of the multi-hitch receiver assembly in accordance with the present invention.

Referring now to FIG. 1, a back perspective view of the preferred embodiment of the multi-hitch receiver assembly in accordance with the present invention is illustrated. As shown in FIG. 1, the preferred multi-hitch receiver assembly is designated generally by reference numeral 30. Preferred multi-hitch receiver assembly 30 comprises main frame 40 which is adapted to be secured to a trailer (see FIGS. 2-4), a means for securing the main frame to a trailer 50, and a pair of receiver box assemblies 60. Preferred main frame 40 has longitudinal axis 42 and a plurality of main frame holes 44. Preferred main frame 40 is adjustable so it can be adapted for use on a variety of different-sized trailer. Preferably, main frame 40 is adapted to be adjustable along longitudinal axis 42. Preferred means for securing the main frame to the trailer 50 comprises at least one plate 52 and at least one plate tensioner hole 54.

Still referring to FIG. 1, each preferred receiver box assembly 60 comprises first member 62 which is adapted to be secured to main frame 40 and has at least one first member pin hole 64 and at least one first member tensioner hole 65. Preferred receiver box assembly 60 also comprises second member 66 which is adapted to removably secure a first cargo carrier and has at least one second member pin hole 68 and at least one second member tensioner hole 69. Preferred receiver box 60 further comprises third member 70 which is adapted to removably secure a second cargo carrier and has at least one third member pin hole 72 and at least one third member tensioner hole 73. Preferably, second member 66 is secured to first member 62 and third member 70 is secured to the second member. Alternatively, second member 66 may be adjustably secured to first member 62 and third member 70 may be adjustably secured to the second member. Preferred receiver box assembly 60 is adapted to be secured to main frame 40 at more than one location on the main frame. While FIG. 1 illustrates the preferred configuration and arrangement of multi-hitch receiver assembly 30, it is contemplated within the scope of the invention that the multi-hitch receiver assembly may be of any suitable configuration and arrangement.

Figure 2:
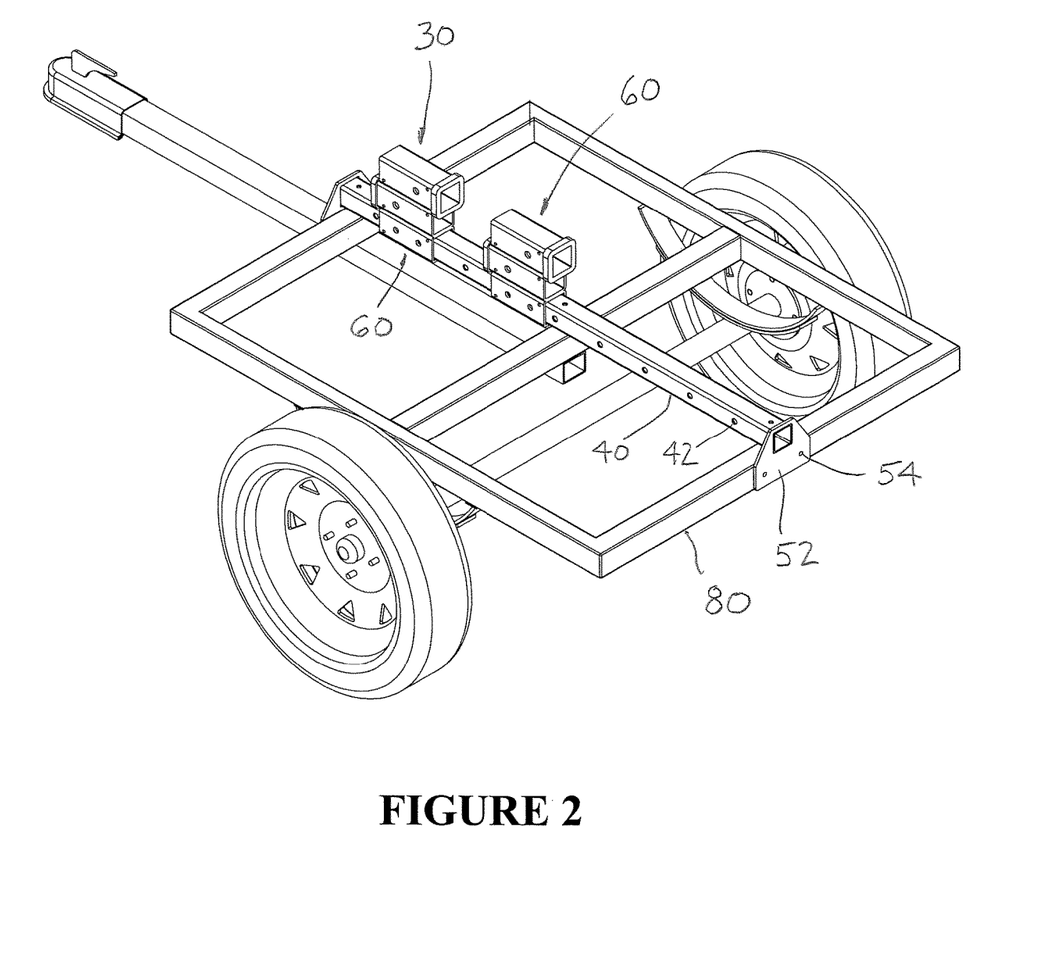
FIG. 2 is a perspective view of the preferred multi-hitch receiver assembly illustrated in FIG. 1 shown on an exemplary trailer.

Referring now to FIG. 2, a perspective view of preferred multi-hitch receiver assembly 30 is illustrated on exemplary trailer 80. As shown in FIG. 2, preferred multi-hitch receiver assembly 30 comprises main frame 40, main frame holes 42, plates 52, plate tensioner holes 54, a pair of receiver box assemblies 60, first members 62, first member pin holes 64, first member tensioner holes 65, second members 66, second member pin holes 68, second member tensioner holes 69, third members 70, third member pin holes 72, and third member tensioner holes 73. Preferably, main frame 40 of multi-hitch receiver assembly 30 is adapted to be removably secured to trailer 80. While FIG. 2 illustrates preferred multi-hitch receiver assembly 30 mounted on exemplary trailer 80, it is contemplated within the scope of the invention that the multi-hitch receiver assembly may be mounted on any suitable device, mechanism, assembly, or combination thereof or directly mounted to a conventional vehicle hitch.

Figure 3:
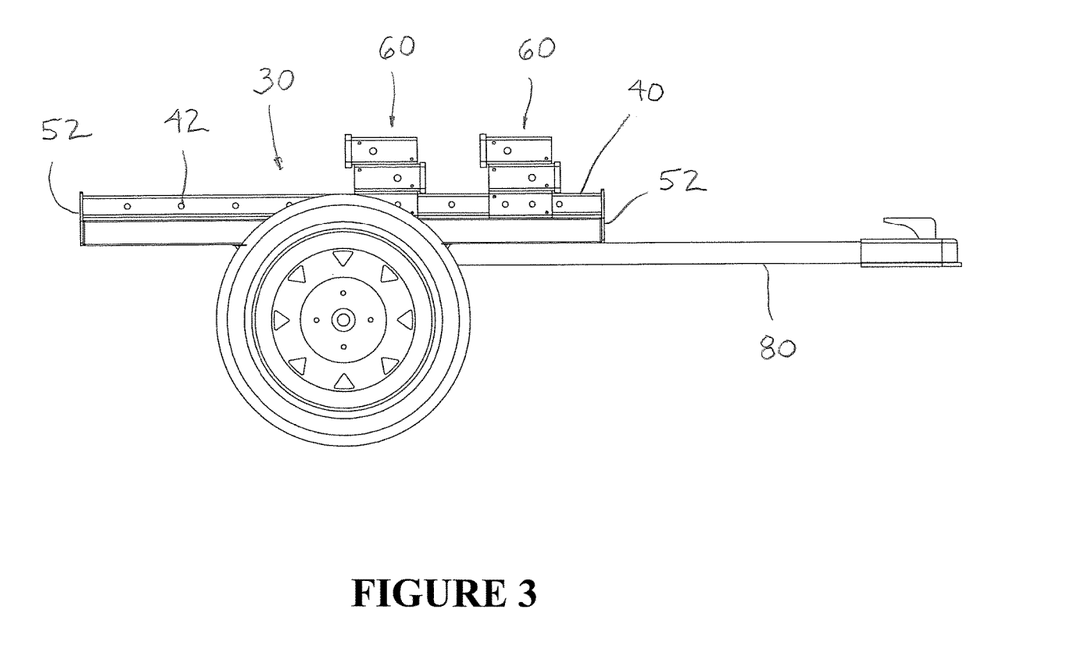
FIG. 3 is a right side view of the preferred multi-hitch receiver assembly illustrated in FIGS. 1-2 shown on an exemplary trailer.

Referring now to FIG. 3, a right side view of preferred multi-hitch receiver assembly 30 is illustrated on exemplary trailer 80. As shown in FIG. 3, preferred multi-hitch receiver assembly 30 comprises main frame 40, main frame holes 42, plates 52, a pair of receiver box assemblies 60, first members 62, first member pin holes 64, first member tensioner holes, second members 66, second member pin holes 68, second member tensioner holes 69, third members 70, third member pin holes 72, and third member tensioner holes 73.

Figure 4:
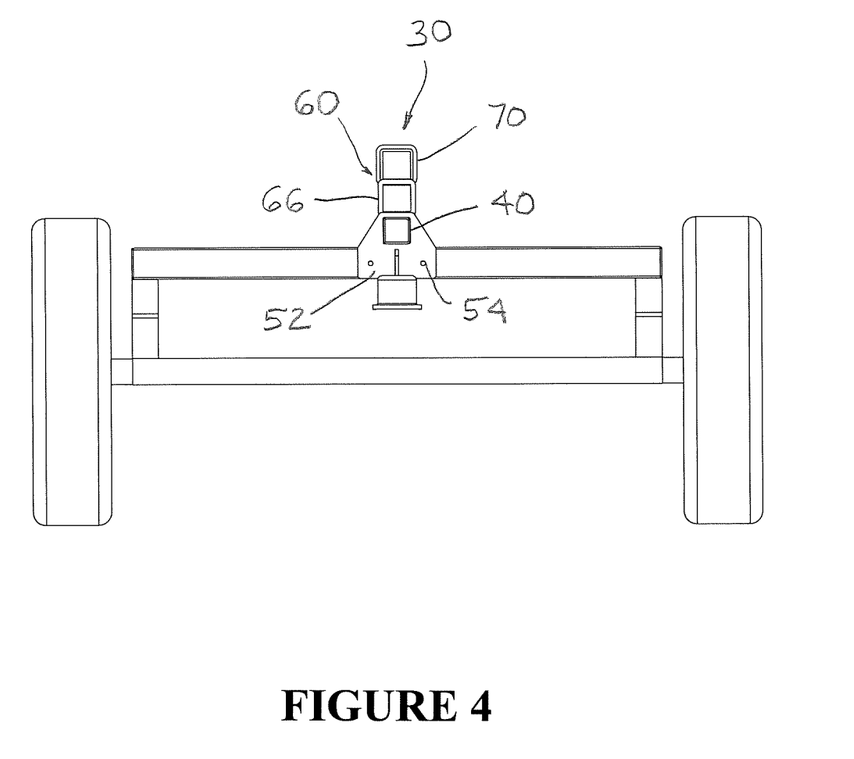
FIG. 4 is a front view of the preferred multi-hitch receiver assembly illustrated in FIGS. 1-3 shown on an exemplary trailer.

Referring now to FIG. 4, a front view of preferred multi-hitch receiver assembly 30 is illustrated on exemplary trailer 80. As shown in FIG. 4, preferred multi-hitch receiver assembly 30 comprises main frame 40, plate 52, plate tensioner holes 54, receiver box assembly 60, second member 66, and third member 70.

Figure 5:
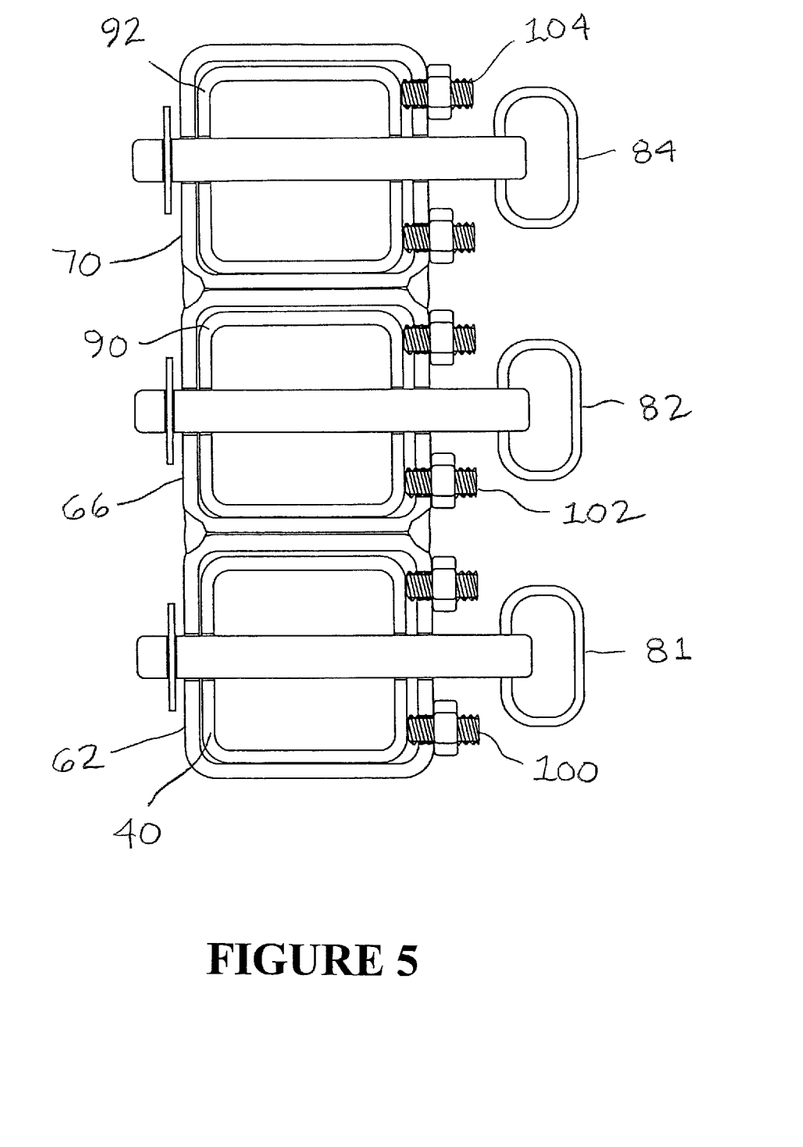
FIG. 5 is a front sectional view of the preferred multi-hitch receiver assembly illustrated in FIGS. 1-4.

Referring now to FIG. 5, a sectional front view of preferred multi-hitch receiver assembly 30 is illustrated with exemplary bicycle racks inserted. As shown in FIG. 5, preferred multi-hitch receiver assembly 30 comprises main frame 40, receiver box assembly 60 having first member 62, second member 66, and third member 70. Preferred multi-hitch receiver assembly 30 also comprises a means for securing the multi-hitch receiver assembly to the main frame, a first means for securing a first cargo carrier to the second member, and a second means for securing a second cargo carrier to the third member. More particularly, preferred multi-hitch receiver assembly 30 comprises first member pin 81, second member pin 82, and third member pin 84 which are adapted to be received in first member pin hole 64, second member pin hole 68, and third member pin hole 72, respectively. Preferred first member pin 81 is adapted to removably secure receiver box assembly 60 to main frame 40. Preferred second member pin 82 and third member pin 84 are adapted to removably secure first bicycle rack 90 and second bicycle rack 92, respectively, to receiver box assembly 60. Preferably, the pins are clevis pins, but it is contemplated within the scope of the invention that the pins may be any suitable device, mechanism, assembly, or combination thereof that is adapted to removably secure the multi-hitch receiver assembly to the main frame and/or removably secure a bicycle rack or other similar cargo carrier to the multi-hitch receiver assembly.

Still referring to FIG. 5, preferred multi-hitch receiver assembly 30 also comprises first member tensioners 100, second member tensioners 102, and third member tensioners 104 which are adapted to be received in first member tensioner holes 65, second member tensioner holes 69, and third member tensioner holes 73, respectively. Preferred first member tensioners 100 are adapted to removably secure receiver box assembly 60 to main frame 40. Preferred second member tensioners 102 and third member tensioners 104 are adapted to removably secure first bicycle rack 90 to second member 66 and second bicycle rack 92 to third member 70, respectively, of receiver box assembly 60. Preferably, the tensioners are threaded fasteners and lock nuts, but it is contemplated within the scope of the invention that the tensioners may be any suitable device, mechanism, assembly, or combination thereof that is adapted to removably secure the multi-hitch receiver assembly to the main frame and/or removably secure a bicycle rack or other similar cargo carrier to the multi-hitch receiver assembly.

Figure 6:
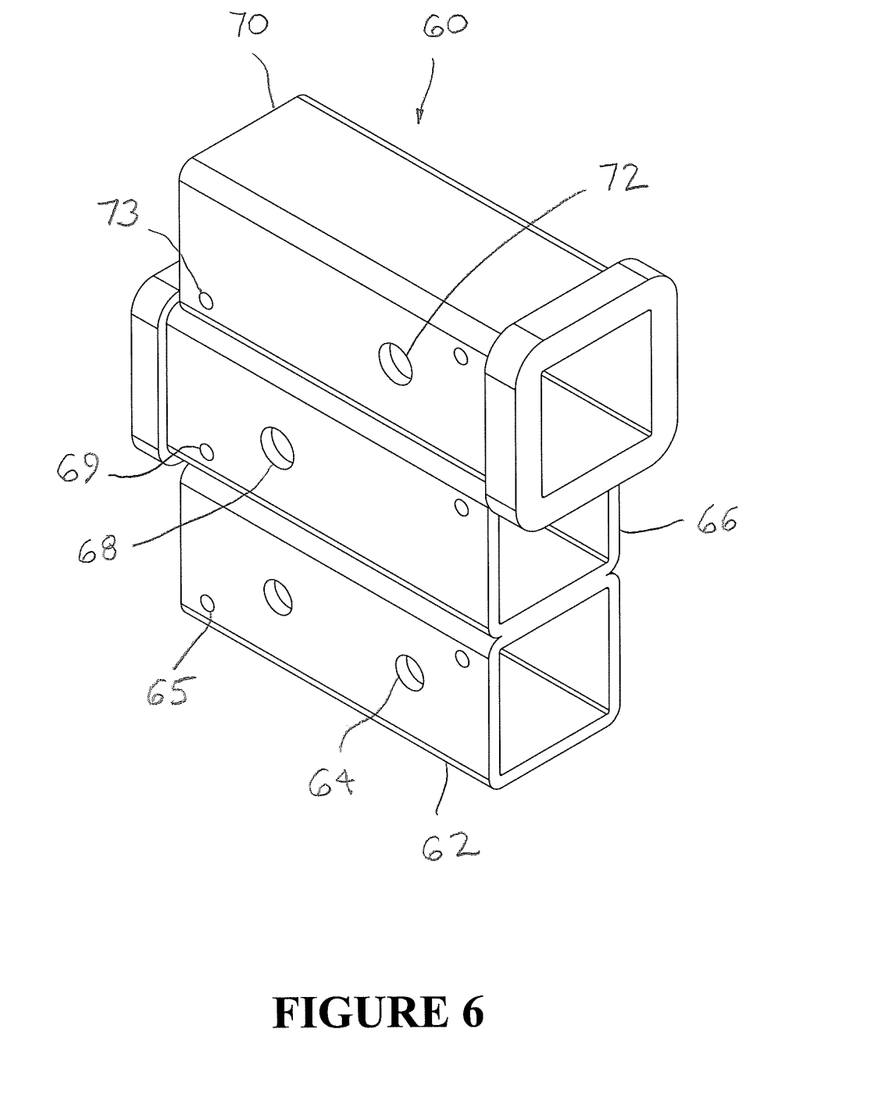
FIG. 6 is a back perspective view of the preferred receiver box assembly illustrated in FIGS. 1-5.
Figure 7:
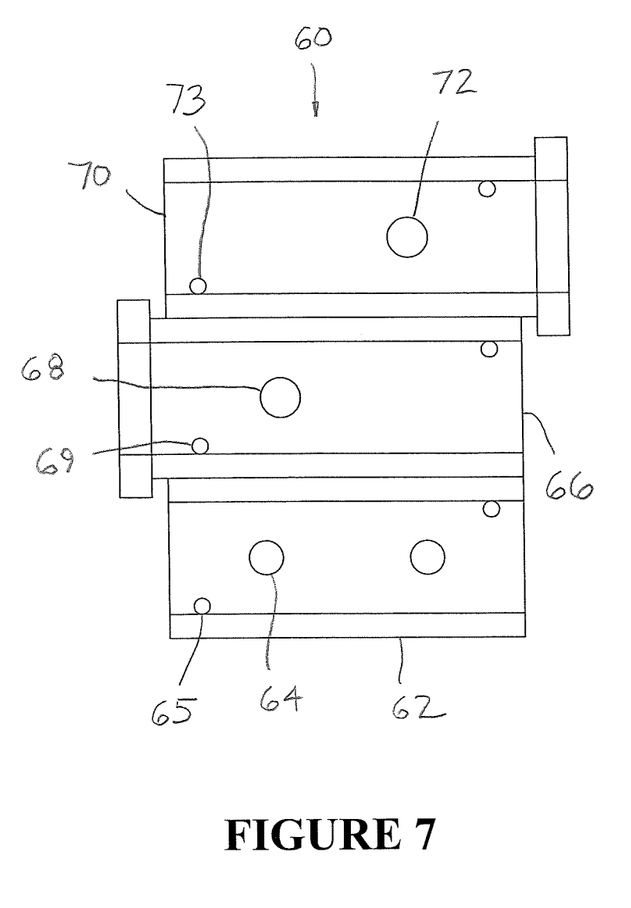
FIG. 7 is a right side view of the preferred receiver box assembly illustrated in FIGS. 1-6.

Referring now to FIG. 6, a back perspective view of preferred receiver box assembly 60 is illustrated. As shown in FIG. 6, preferred receiver box assembly 60 comprises first member 62, first member pin holes 64, first member tensioner holes 65, second member 66, second member pin hole 68, second member tensioner holes 69, third member 70, third member pin hole 72 and third member tensioner holes 73. While FIG. 6 illustrates the preferred configuration and arrangement of receiver box assembly 60, it is contemplated within the scope of the invention that the receiver box assembly may be of any suitable configuration and arrangement. Referring now to FIG. 7, a right side view of preferred receiver box assembly 60 is illustrated. As shown in FIG. 7, preferred receiver box assembly 60 comprises first member 62, first member pin holes 64, first member tensioner holes 65, second member 66, second member pin hole 68, second member tensioner holes 69, third member 70, third member pin hole 72, and third member tensioner holes 73.

Figure 8:
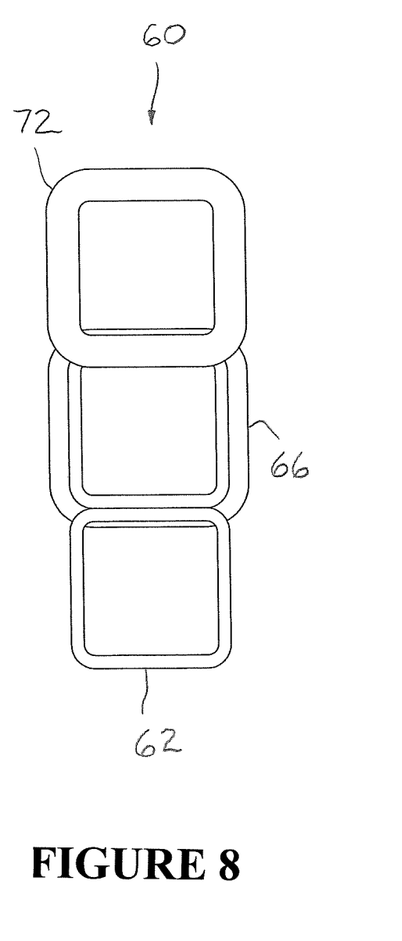
FIG. 8 is a back view of the preferred receiver box assembly illustrated in FIGS. 1-7.

Referring now to FIG. 8, a back view of preferred receiver box assembly 60 is illustrated. As shown in FIG. 8, preferred receiver box assembly 60 comprises first member 62, second member 66, and third member 70.

Figure 9:
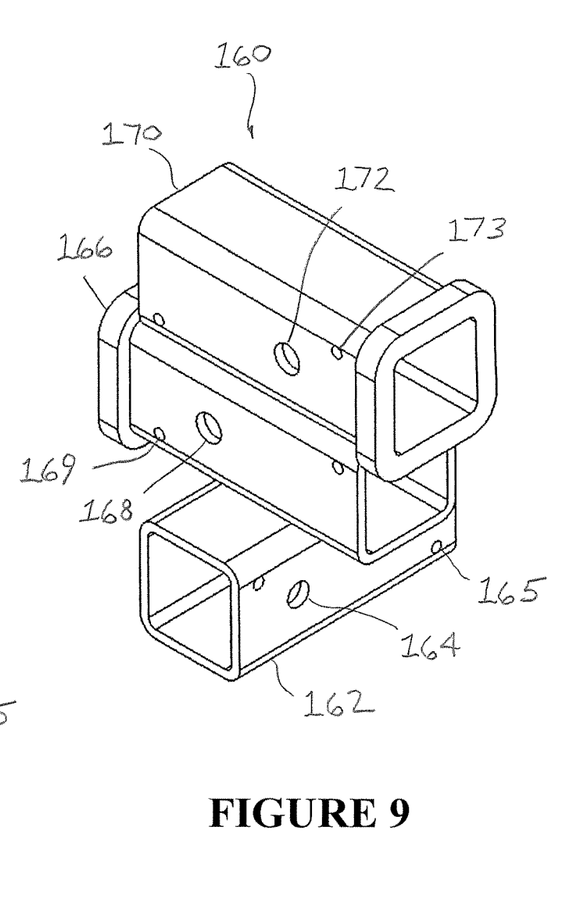
FIG. 9 is a back perspective view of a first alternative embodiment of the receiver box assembly in accordance with the present invention.

Referring now to FIG. 9, a back perspective view of a first alternative embodiment of the receiver box assembly in accordance with the present invention is illustrated. As shown in FIG. 9, the preferred receiver box assembly is designated by reference numeral 160. Preferred receiver box assembly 160 comprises first member 162 having first member pin hole 164 and first member tensioner hole 165, second member 166, second member pin hole 168, second member tensioner holes 169, third member 170, third member pin hole 172, and third member tensioner holes 173. As also shown in FIG. 9, preferred second member 166 is fixedly secured to first member 162 at an angle, and preferred third member 170 is disposed substantially parallel the second member. While FIG. 9 illustrates the preferred configuration and arrangement of receiver box assembly 160, it is contemplated within the scope of the invention that the receiver box assembly may be of any suitable configuration and arrangement.

Figure 10:
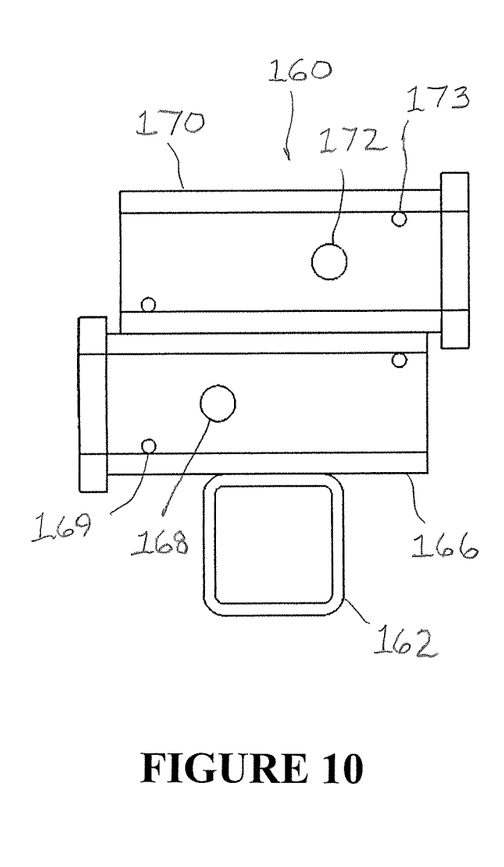
FIG. 10 is a right side view of the preferred receiver box assembly illustrated in FIG. 9.

Referring now to FIG. 10, a right side view of preferred receiver box assembly 160 is illustrated. As shown in FIG. 10, preferred receiver box assembly 160 comprises first member 162, second member 166, second member pin hole 168, second member tensioner holes 169, third member 170, third member pin hole 172, and third member tensioner holes 173.

Figure 11:
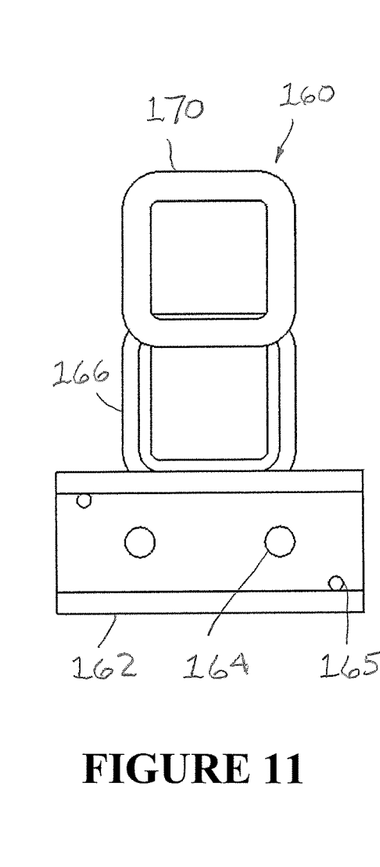
FIG. 11 is a front view of the preferred receiver box assembly illustrated in FIGS. 9-10.

Referring now to FIG. 11, a front view of preferred receiver box assembly 160 is illustrated. As shown in FIG. 11, preferred receiver box assembly 160 comprises first member 162, first member pin holes 164, first member tensioner holes 165, second member 166, and third member 170.

Figure 12:
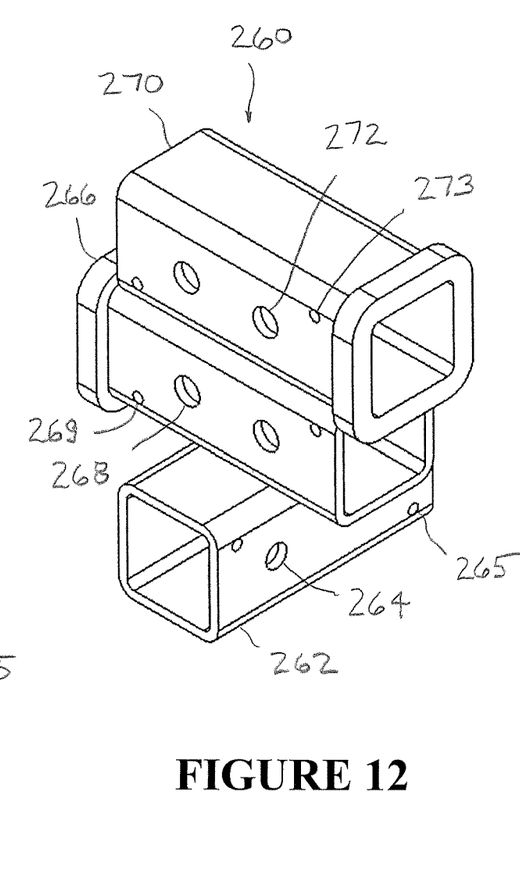
FIG. 12 is a back perspective view of a second alternative embodiment of the receiver box assembly in accordance with the present invention.

Referring now to FIG. 12, a back perspective view of a second alternative embodiment of the receiver box assembly in accordance with the present invention is illustrated. As shown in FIG. 12, the preferred receiver box assembly is designated generally by reference numeral 260. Preferred receiver box assembly 260 comprises first member 262, first member pin hole 264, first member tensioner hole 265, second member 266, second member pin holes 268, second member tensioner holes 269, third member 270, third member pin holes 272, and third member tensioner holes 273. As also shown in FIG. 12, preferred second member 266 is fixedly secured to first member 262 at an angle, and preferred third member 270 is disposed substantially parallel the second member. Further, preferred second member 266 and third member 270 comprise a pair of pin holes. While FIG. 12 illustrates the preferred configuration and arrangement of receiver box assembly 260, it is contemplated within the scope of the invention that the receiver box assembly may be of any suitable configuration and arrangement.

Figure 13:
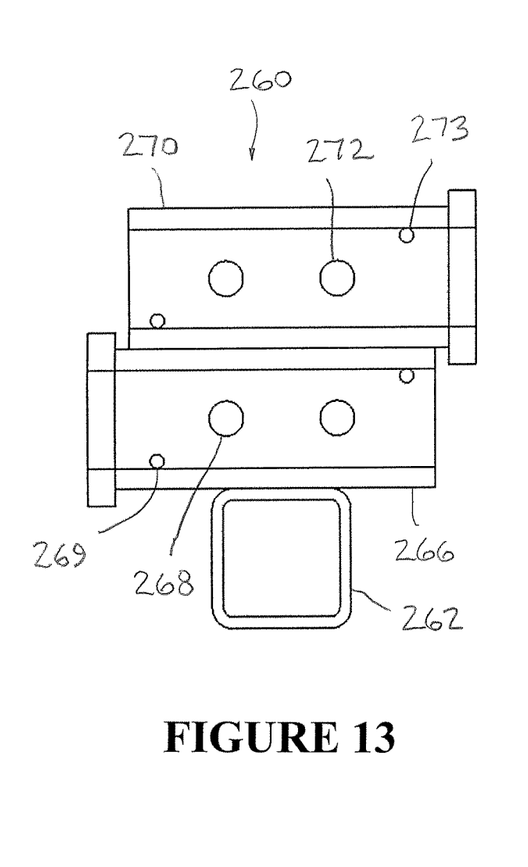
FIG. 13 is a right side view of the preferred receiver box assembly illustrated in FIG. 12.

Referring now to FIG. 13, a right side view of preferred receiver box assembly 260 is illustrated. As shown in FIG. 13, preferred receiver box assembly 260 comprises, first member 262, second member 266, second member pin holes 268, second member tensioner holes 269, third member 270, third member pin holes 272, and third member tensioner holes 273.

Figure 14:
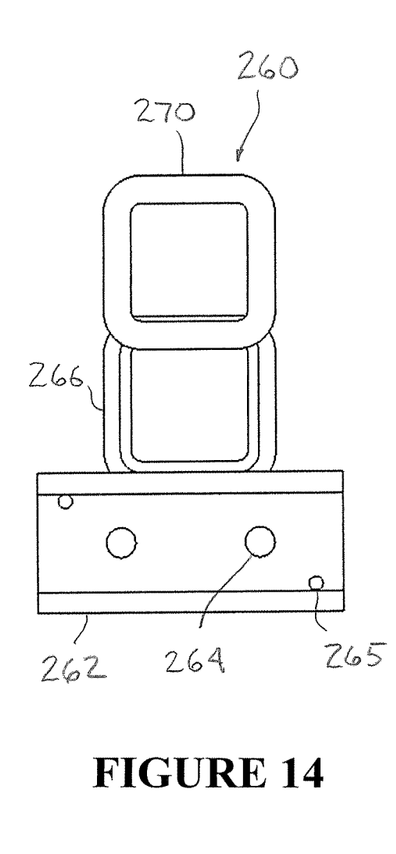
FIG. 14 is a front view of the preferred receiver box assembly illustrated in FIGS. 12-13.

Referring now to FIG. 14, a front view of preferred receiver box assembly 260 is illustrated. As shown in FIG. 14, preferred receiver box assembly 260 comprises first member 262, first member pin holes 264, first member tensioner holes 265, second member 266, and third member 270.

Figure 15:
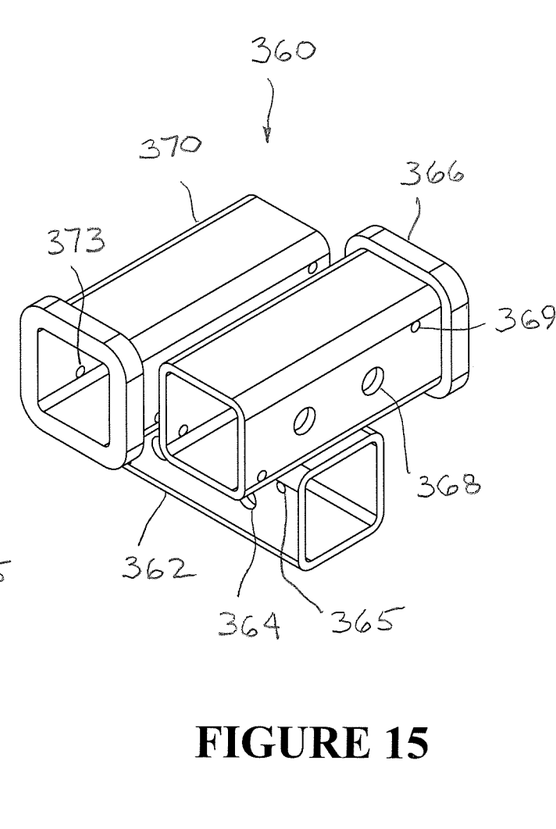
FIG. 15 is a back perspective view of a third alternative embodiment of the receiver box assembly in accordance with the present invention.

Referring now to FIG. 15, a back perspective view of a third alternative embodiment of the receiver box assembly in accordance with the present invention is illustrated. As shown in FIG. 15, the preferred receiver box assembly is designated generally by reference number 360. Preferred receiver box assembly 360 comprises first member 362, first member pin hole 364, first member tensioner hole 365, second member 366, second member pin holes 368, second member tensioner holes 369, third member 370, and third member tensioner holes. As also shown in FIG. 15, preferably both second member 366 and third member 370 are secured to first member 362. While FIG. 15 illustrates the preferred configuration and arrangement of receiver box assembly 360, it is contemplated within the scope of the invention that the receiver box assembly may be of any suitable configuration and arrangement.

Figure 16:
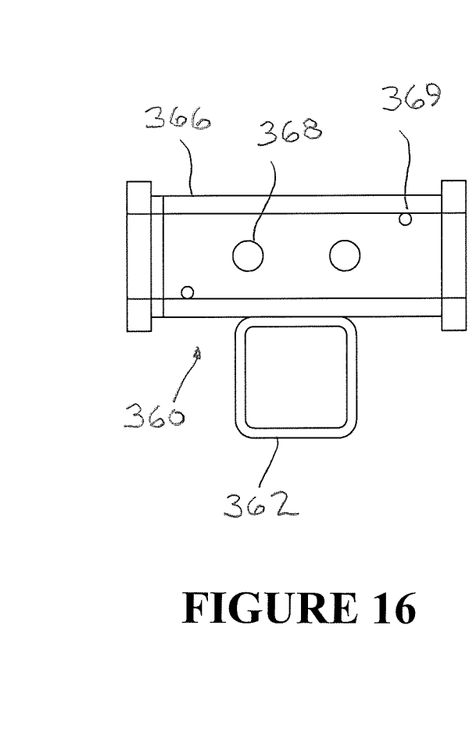
FIG. 16 is a front view of the preferred receiver box assembly illustrated in FIG. 15.

Referring now to FIG. 16, a front view of preferred receiver box assembly 360 is illustrated. As shown in FIG. 16, preferred receiver box assembly 360 comprises, first member 362, second member 366, second member pin holes 368, and second member tensioner holes 369.

Figure 17:
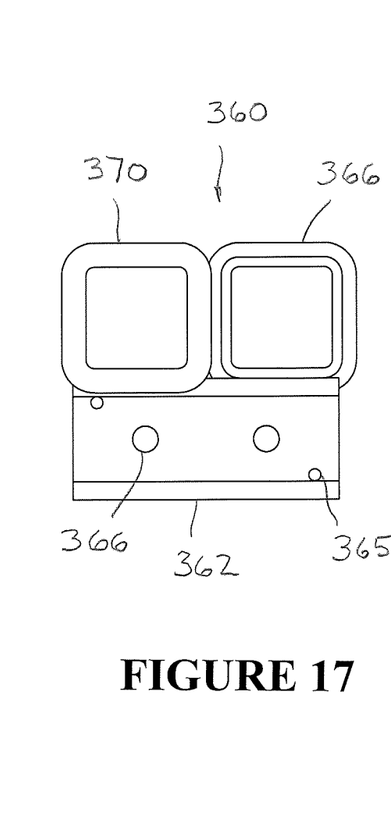
FIG. 17 is a right side view of the preferred receiver box assembly illustrated in FIGS. 15-16.

Referring now to FIG. 17, a right side view of preferred receiver box assembly 360 is illustrated. As shown in FIG. 17, preferred receiver box assembly 360 comprises first member 362, first member pin holes 264, first member tensioner holes 265, second member 266, and third member 270.

Figure 18:
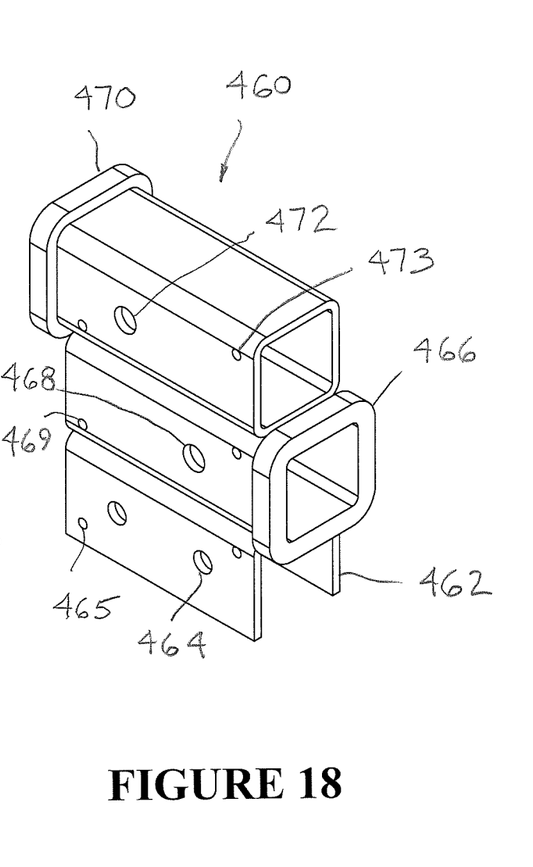
FIG. 18 is a back perspective view of a fourth alternative embodiment of the receiver box assembly in accordance with the present invention.

Referring now to FIG. 18, a back perspective view of a fourth alternative embodiment of the receiver box assembly in accordance with the present invention is illustrated. As shown in FIG. 18, the preferred receiver box assembly is designated generally by reference numeral 460. Preferred receiver box assembly 460 comprises first member 462, first member pin hole 464, first member tensioner hole 465, second member 466, second member pin holes 468, second member tensioner holes 469, third member 470, third member pin holes 472, and third member tensioner holes 473. As also shown in FIG. 17, first member 462 is a U-shaped channel so the first member can fit over a main frame. While FIG. 18 illustrates the preferred configuration and arrangement of receiver box assembly 460, it is contemplated within the scope of the invention that the receiver box assembly may be of any suitable configuration and arrangement.

Figure 19:
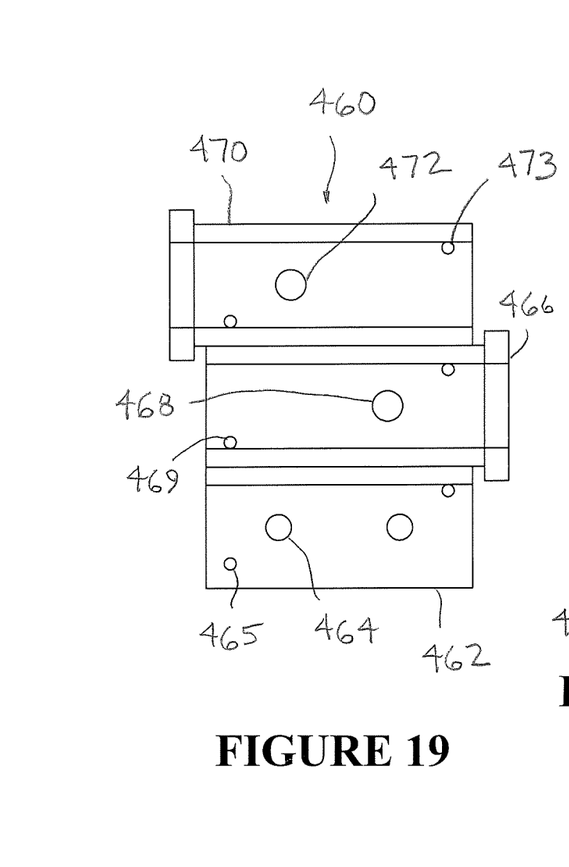
FIG. 19 is a right side view of the preferred receiver box assembly illustrated in FIG. 18.

Referring now to FIG. 19, a right side view of preferred receiver box assembly 460 is illustrated. As shown in FIG. 19, preferred receiver box assembly 460 comprises, first member 462, first member pin holes 464, first member tensioner holes 465, second member 466, second member pin holes 468, second member tensioner holes 469, third member 470, third member pin holes 472, and third member tensioner holes 473.

Figure 20:
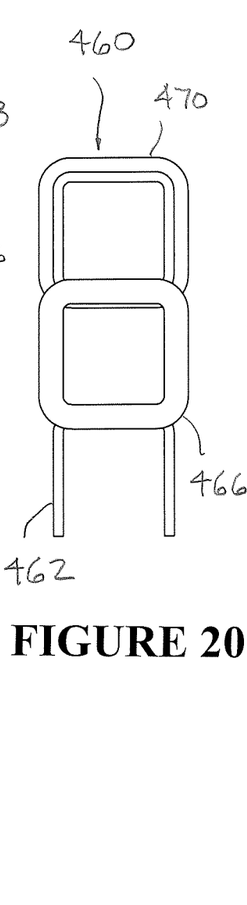
FIG. 20 is a front view of the preferred receiver box assembly illustrated in FIGS. 18-19.

Referring now to FIG. 20, a front view of preferred receiver box assembly 460 is illustrated. As shown in FIG. 20, preferred receiver box assembly 460 comprises first member 462, first member pin holes 464, first member tensioner holes 465, second member 466, and third member 470.

The invention also comprises a method for a multi-hitch receiver assembly. The preferred method comprises providing a multi-hitch receiver assembly adapted for use on a trailer. The preferred multi-hitch receiver assembly comprises a main frame that is adapted to be secured to the trailer, a means for securing the main frame to the trailer, and at least one receiver box assembly. The preferred at least one receiver box assembly comprises a first member that is adapted to be secured to the main frame, a second member that is adapted to removably secure a first cargo carrier and is secured to the first member, and a third member that is adapted to removably secure a second cargo carrier and is secured to the second member. Preferably, the at least one receiver box assembly is adapted to be secured to the main frame at more than one location on the main frame. The method further comprises securing the main frame to the trailer. In other preferred embodiments of the method for a multi-hitch receiver assembly, the method also comprises adjusting the at least one receiver box assembly on the main frame, adjusting the second member relative to the first member, and adjusting the third member relative to the second member.

In operation, several advantages of the preferred embodiments of the apparatus and method for a multi-hitch receiver assembly are achieved. For example, the preferred embodiments of the apparatus and method for a multi-hitch receiver assembly are inexpensive, simple, compact, and easy to use. The preferred embodiments of the apparatus and method for a multi-hitch receiver assembly have unlimited capacity, are scalable, and are adapted for use with different-sized bicycles, bicycle racks, and other cargo carriers. The preferred embodiments of the apparatus and method for a multi-hitch receiver assembly do not restrict access to the rear compartment of a vehicle, do not require any bicycle disassembly, and serve as an efficient means for storing bicycles and other cargo when they are not in transit. The preferred embodiments of the apparatus and method for a multi-hitch receiver assembly reduce both the tongue weight on the rear axle of the transporting vehicle and the rattling of the apparatus and/or cargo such as bicycles. The preferred embodiments of the apparatus and method for a multi-hitch receiver assembly also safely secure cargo such as bicycles during transport.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A multi-hitch receiver assembly, said multi-hitch receiver assembly comprising:
   (a) a trailer having a trailer longitudinal axis along the longest length of the trailer and substantially parallel to the direction of travel of the trailer, a pair of lateral sides spaced a distance apart from each other and disposed substantially parallel to the trailer longitudinal axis, a trailer centerline being disposed substantially parallel to the trailer longitudinal axis and spaced substantially equally apart from each of the lateral sides of the trailer, a forward end disposed substantially perpendicular to the trailer longitudinal axis, the pair of lateral sides, and the trailer centerline, and a rearward end disposed substantially perpendicular to the trailer longitudinal axis, the pair of lateral sides, and the trailer centerline and spaced a distance apart from the forward end;
   (b) a main frame, said main frame being adapted to be secured to the trailer and having a main frame longitudinal axis, said main frame longitudinal axis being along the longest length of the main frame, and said main frame being disposed substantially horizontally along the trailer centerline between the forward end and the rearward end of the trailer;
   (c) a tensioner and plate assembly for securing the main frame to the trailer;
   (d) a plurality of receiver box assemblies, each of said receiver box assemblies comprising:
      (i) a first member, said first member being adapted to be secured to the main frame in a substantially horizontal disposition;
      (ii) a second member, said second member being adapted to removably secure a first cargo carrier and being secured to the first member such that the second member is substantially parallel to the first member and in a substantially horizontal disposition;
      (iii) a third member, said third member being adapted to removably secure a second cargo carrier and being secured to the second member such that the third member is disposed substantially parallel to the second member and the first member, in a substantially horizontal disposition, and one hundred eighty degrees (180°) relative to the second member;

wherein the plurality of receiver box assemblies is adapted to be secured to the main frame at more than one location on the main frame; and wherein each of the plurality of receiver box assemblies is aligned along the longitudinal axis of the main frame.

2. The multi-hitch receiver assembly of claim 1 wherein the main frame is removably attached to the trailer.

3. The multi-hitch receiver assembly of claim 1 wherein the tensioner and plate assembly comprises a plurality of plates.

4. The multi-hitch receiver assembly of claim 1 wherein the tensioner and plate assembly comprises at least one threaded fastener.

5. The multi-hitch receiver assembly of claim 1 wherein the first member is secured to the main frame with at least one pin.

6. The multi-hitch receiver assembly of claim 1 wherein the first member is secured to the main frame with at least one tensioner.

7. The multi-hitch receiver assembly of claim 1 wherein the second member is fixedly secured to the first member at an angle.

8. The multi-hitch receiver assembly of claim 1 wherein the multi-hitch receiver assembly comprises a pin for removably securing the first cargo carrier to the second member.

9. The multi-hitch receiver assembly of claim 1 wherein the multi-hitch receiver assembly comprises a pin and a tensioner for removably securing the first cargo carrier to the second member.

10. The multi-hitch receiver assembly of claim 1 wherein the third member is fixedly secured to the second member at an angle.

11. The multi-hitch receiver assembly of claim 1 wherein the multi-hitch receiver assembly comprises a pin for removably securing the second cargo carrier to the third member.

12. The multi-hitch receiver assembly of claim 1 wherein the multi-hitch receiver assembly comprises a pin and a tensioner for removably securing the second cargo carrier to the third member.

13. A multi-hitch receiver assembly, said multi-hitch receiver assembly comprising:
   (a) a trailer having a trailer longitudinal axis along the longest length of the trailer and substantially parallel to the direction of travel of the trailer, a pair of lateral sides spaced a distance apart from each other and disposed substantially parallel to the trailer longitudinal axis, a trailer centerline being disposed substantially parallel to the trailer longitudinal axis and spaced substantially equally apart from each of the lateral sides of the trailer, a forward end disposed substantially perpendicular to the trailer longitudinal axis, the pair of lateral sides, and the trailer centerline, and a rearward end disposed substantially perpendicular to the trailer longitudinal axis, the pair of lateral sides, and the trailer centerline and spaced a distance apart from the forward end;
   (b) a main frame, said main frame being adapted to be secured to the trailer and having a main frame longitudinal axis, said main frame longitudinal axis being along the longest length of the main frame, and said main frame being disposed substantially horizontally along the trailer centerline between the forward end and the rearward end of the trailer;
   (c) a tensioner and plate assembly for securing the main frame to the trailer;

(d) a plurality of receiver box assemblies, each of said receiver box assemblies comprising:
  (i) a first member, said first member being adapted to be secured to the main frame in a substantially horizontal disposition;
  (ii) a second member, said second member being adapted to removably secure a first cargo carrier and being secured to the first member such that the second member is substantially parallel to the first member and in a substantially horizontal disposition;
  (iii) a third member, said third member being adapted to removably secure a second cargo carrier and being secured to the first member such that the third member is disposed substantially parallel to the second member and the first member, in a substantially horizontal disposition, and one hundred eighty degrees (180°) relative to the second member;
wherein the plurality of receiver box assemblies is adapted to be secured to the main frame at more than one location on the main frame; and wherein each of the plurality of receiver box assemblies is aligned along the longitudinal axis of the main frame.

14. A method for a multi-hitch receiver assembly, said method comprising:
  (a) providing a multi-hitch receiver assembly, said multi-hitch receiver assembly comprising:
    (i) a trailer having a trailer longitudinal axis along the longest length of the trailer and substantially parallel to the direction of travel of the trailer, a pair of lateral sides spaced a distance apart from each other and disposed substantially parallel to the trailer longitudinal axis, a trailer centerline being disposed substantially parallel to the trailer longitudinal axis and spaced substantially equally apart from each of the lateral sides of the trailer, a forward end disposed substantially perpendicular to the trailer longitudinal axis, the pair of lateral sides, and the trailer centerline, and a rearward end disposed substantially perpendicular to the trailer longitudinal axis, the pair of lateral sides, and the trailer centerline and spaced a distance apart from the forward end;
    (ii) a main frame, said main frame being adapted to be secured to the trailer and having a main frame longitudinal axis, said main frame longitudinal axis being along the longest length of the main frame, and said main frame being disposed substantially horizontally along the trailer centerline between the forward end and the rearward end of the trailer;
    (iii) a tensioner and plate assembly for securing the main frame to the trailer;
    (iv) a plurality of receiver box assemblies, each of said receiver box assemblies comprising:
      (1) a first member, said first member being adapted to be secured to the main frame in a substantially horizontal disposition;
      (2) a second member, said second member being adapted to removably secure a first cargo carrier and being secured to the first member such that the second member is substantially parallel to the first member and in a substantially horizontal disposition;
      (3) a third member, said third member being adapted to removably secure a second cargo carrier and being secured to the second member such that the third member is disposed substantially parallel to the second member and the first member, in a substantially horizontal disposition, and one hundred eighty degrees (180°) relative to the second member;
    wherein the plurality of receiver box assemblies is adapted to be secured to the main frame at more than one location on the main frame; and wherein each of the plurality of receiver box assemblies is aligned along the longitudinal axis of the main frame;
  (b) securing the main frame to the trailer.

15. The method of claim 14 further comprising:
  (c) adjusting the plurality of receiver box assemblies on the main frame.

* * * * *